(12) United States Patent
Münzenberger

(10) Patent No.: US 6,831,118 B2
(45) Date of Patent: Dec. 14, 2004

(54) FLEXIBLE FIRE PROTECTION PLATE AND ITS USE FOR THE FIRE PROTECTION OF OPENINGS IN WALLS, FLOORS AND CEILINGS

(75) Inventor: Herbert Münzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 335 days.

(21) Appl. No.: 09/941,115

(22) Filed: Aug. 28, 2001

(65) Prior Publication Data

US 2002/0068775 A1 Jun. 6, 2002

(30) Foreign Application Priority Data

Aug. 30, 2000 (DE) .......................................... 100 42 580

(51) Int. Cl.$^7$ ................................................. C08K 3/34
(52) U.S. Cl. ........................ 523/218; 523/219; 524/444; 524/445; 524/450; 524/439
(58) Field of Search ................................ 524/445, 444, 524/450; 523/218, 219, 439

(56) References Cited

U.S. PATENT DOCUMENTS 4,107,376 A * 8/1978 Ishikawa ..................... 428/306

FOREIGN PATENT DOCUMENTS

| DE | 9603424 | 8/1997 |
| DE | 9905153 | 9/1999 |

* cited by examiner

*Primary Examiner*—Edward J. Cain
(74) *Attorney, Agent, or Firm*—Sidley Austin Brown & Wood, LLP

(57) ABSTRACT

The description relates to a flexible fire protection plate having a plastic matrix and an inorganic filler made of a pliable organic binder in which a coarse-grained inorganic filler is embedded, as well as the use of this fire protection plate for the fire protection of openings in walls, floors and ceilings, especially of conduits for pipes and cables

20 Claims, 2 Drawing Sheets

Figure 1:
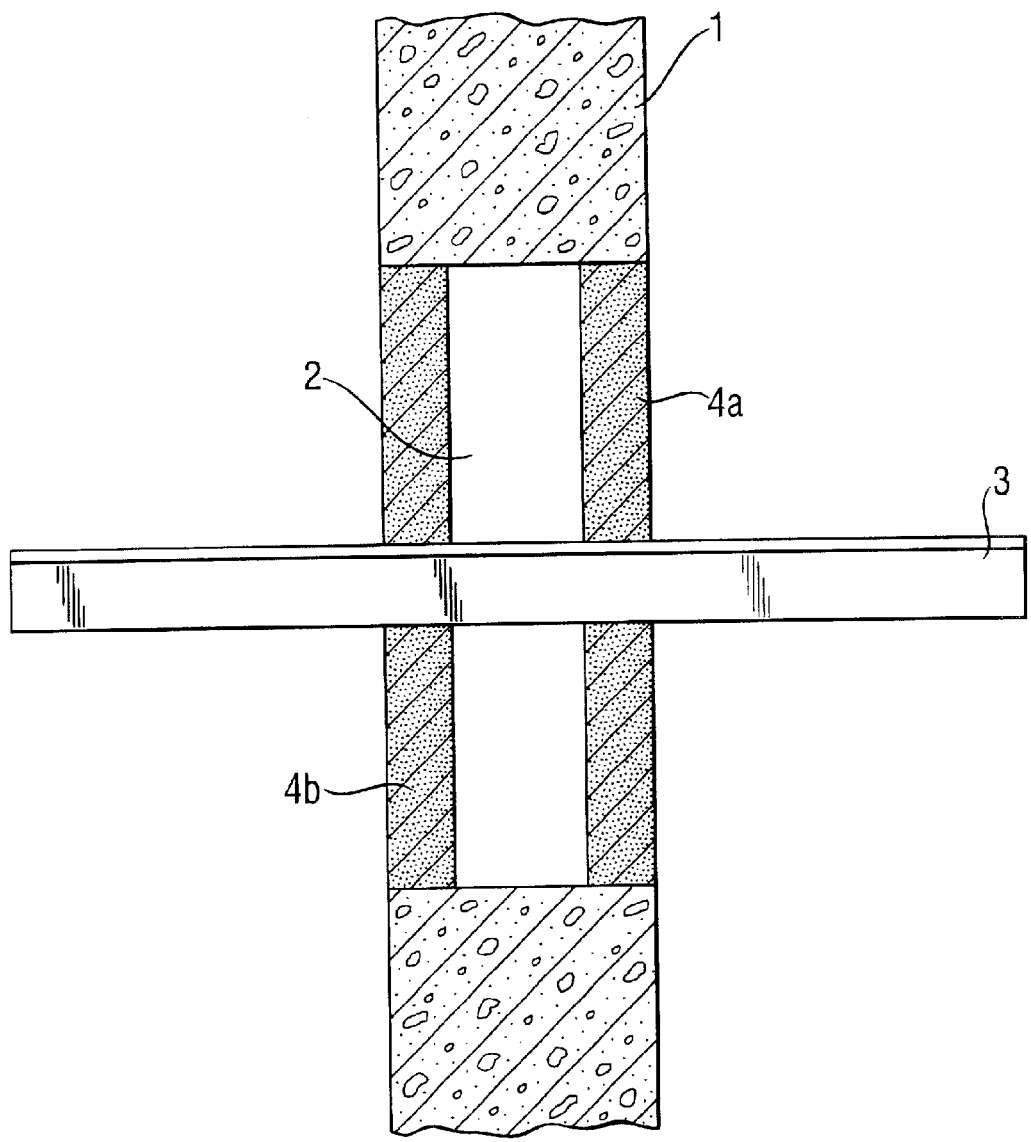

FLEXIBLE FIRE PROTECTION PLATE AND ITS USE FOR THE FIRE PROTECTION OF OPENINGS IN WALLS, FLOORS AND CEILINGS

The subject matter of the present invention is a flexible fire protection plate having a plastic matrix and an inorganic filler as well as its use for the fire protection of openings in walls, floors and ceilings, especially of conduits for pipes and cables.

It is known that openings through the walls, floors and ceilings of adjacent rooms are problematic in case of fire because the fire can propagate through such openings. Since, as a rule, it is structurally not possible to avoid wall or ceiling conduits, especially conduits for pipes and cables, as a way to ensure protection against fire, it is common practice to seal off such conduits and the annular gap between the installed pipes and cables—as well as any flanges—and the wall, floor and ceiling material. For this purpose, so-called soft partitions or plate partitions made of non-flammable material are used.

One possible way to make such a fire partition consists of using coated mineral fiber plates with which the structure openings can be closed off, after which all gaps, joints, spandrels and also the surface of the fire protection plates are sealed with an ablative or intumescent coating so as to be smoke-tight. Such mineral fiber plates, however, have drawbacks since they are very labor-intensive and unpleasant to install, and they only provide a low level of mechanical stability in case of fire. In particular, such mineral fiber plates do not pass the extinguishing water test (hose stream test) in case of fire, which means that, upon impact from the stream of water used by a firefighter, the remnants of such a mineral fiber plate are very easily destroyed.

Another possibility that is commonly employed in the United States is the use of sandwich plates, that is to say, multi-layer plates made of a layer of sheet steel, a 1 cm-thick layer of a rubbery-elastic intumescent compound with a reinforcement of netting wire and a covering of aluminum foil that is fitted to and mounted over the structure opening. Subsequently, all of the joints, gaps, spandrels and the like are sealed with an intumescent compound. These sandwich plates are likewise time-consuming and costly to install, since the necessary cutting is very difficult in view of the layer of sheet steel. Furthermore, approval for such sandwich plates under German standard DIN 4102, part 9—according to which not only the fire penetration but especially also excessive temperatures are to be prevented—can only be attained with complicated measures or not at all.

Therefore, the objective of the present invention is to provide a fire protection plate that can be manufactured and installed very simply, that exhibits a high mechanical strength, not only during installation but also in case of fire, and that makes it possible to fully comply with the fire protection requirements according to the DIN standard mentioned above.

This objective is achieved by a flexible fire protection plate that contains a coarse-grained inorganic filler embedded in a plastic matrix made of a pliable organic binder.

Therefore, the subject matter of the invention is the flexible fire protection plate according to claim 1.

The subordinate claims relate to preferred embodiments of this fire protection plate as well as to their use for the fire protection of openings in walls, floors and ceilings, especially of conduits for pipes and cables.

The fire protection plate according to the invention having a plastic matrix and an inorganic filler is characterized by a plate made of a pliable organic binder in which a coarse-grained inorganic filler is embedded.

As the pliable binder, the fire protection plate preferably contains a vulcanized caoutchouc compound, a dispersion acrylate, a polyvinyl acetate and especially a pliable polyurethane polymer, preferably a pliable polyurethane foam that is preferably made of a polyisocyanate, a polyol and water, or an isocyanate prepolymer. Preferably, the formation of the polyurethane foam can be promoted by using a foaming agent on the basis of a liquefied gas.

As the vulcanized caoutchouc compounds, preferred materials that can be used according to the invention are vulcanizable rubber compounds, that is to say, mixtures of low-molecular-weight synthetic caoutchouc with cross-linkable double bonds, whereby the vulcanization is usually carried out with sulfur (or sulfur compounds) at temperatures ranging from 150° C. to 180° C. [302° F. to 356° F.]. Foaming agents (for example, baking powder, etc.) can be added to the mixtures so that rubbery-elastic foams are obtained. Examples of dispersion acrylates are polymeric dispersions of polyacrylates, usually copolymers of acrylic acid esters, such as ethyl acrylate and butyl acrylate. These polymeric dispersions contain between 30% and 60% of the polymer. The curing is carried out by drying out.

The fire protection plate according to the invention preferably contains 30% to 80% by weight, especially 65% to 75%, of the pliable binder and correspondingly 70% to 20% by weight, especially 35% to 25% by weight, of the coarse-grained inorganic filler.

The coarse-grained inorganic filler preferably comprises grains having a particle size of 1 mm to 25 mm, preferably 3 mm to 15 mm. Especially preferred coarse-grained inorganic fillers are grains consisting of a foamed mineral material, for example, grains made of pumice, porous concrete, water-glass foam, geopolymers, sepiolite, fly ash, gypsum, foamed expanded clay, perlite and/or vermiculite, or else hollow beads made of silicate material or glass.

The geopolymers used as the inorganic filler are synthetically produced silicate foams, for example, made of water glass with fly ash or corundum and peroxides or metal powder as the foaming agents. These foams are non-flammable and have good insulating properties. Waste from the manufacturing process can also be used according to the invention as the inorganic filler.

As a function of the envisaged strength properties of the fire protection plate, it is possible to use the coarse-grained inorganic filler in the form of mixtures of grains having varying particle sizes and/or in the form of mixtures of grains of different inorganic materials.

The presence of the coarse-grained inorganic filler translates not only into a high mechanical strength, stability and resistance to pressure on the part of the fire protection plate, but rather, especially in the case of grains made of foamed mineral material, also into easy and simple processability, for example, when it comes to cutting or sawing and moreover, a high strength in case of fire.

According to a preferred embodiment of the invention, the pliable binder contains an additive to increase the dimensional stability of the crust that forms in case of fire. This additive is preferably an additive mixture containing at least one acidifier, at least one compound that yields carbon and at least one particulate metal.

It has been found that, when such an additive mixture is added to the pliable organic binder of the fire protection plate according to the invention in an amount of 10% to 60% by weight, preferably 25% to 40% by weight, relative to the weight of the binder, a marked improvement of the dimensional stability of the fire protection plate can be achieved in case of fire. Through the addition of this additive mixture, in case of fire, the pliable organic binder is converted—without a substantial change of the geometric dimensions of the fire protection plate—into an inorganic, hard, stone-like, fire-resistant compound. In this manner, the fire protection plate according to the invention can pass the above-mentioned hose stream test without any problem.

According to a preferred embodiment, the additive mixture incorporated into the pliable organic binder contains 10% to 90% by weight, preferably 40% to 70% by weight, of the acidifier, 5% to 45% by weight, preferably 15% to 30% by weight, of the compound that yields carbon and 2% to 30% by weight, preferably 5% to 15% by weight, of the particulate metal.

As the acidifier, preference is given to salts or esters of inorganic, non-volatile acids, selected from among sulfuric acid, phosphoric acid or boric acid. According to an especially preferred embodiment, the acidifier contained in the additive mixture is ammonium phosphate, ammonium polyphosphate, a diamine phosphate, a phosphoric acid ester with monovalent or polyvalent alcohols, especially polyols, such as pentaerythritol, specifically pentaerythritol phosphate, trichloroethyl phosphate, tris(2-chloroisopropyl) phosphate, triphenyl phosphate, tris(2-chloroethyl) phosphate, a phosphoric acid partial ester or phosphoric acid hetero-ester with monovalent and/or polyvalent low-molecular-weight alcohols, a melamine phosphate, especially monomelamine orthophosphate, dimelamine orthophosphate, dimelamine pyrophosphate, melamine polyphosphate and/or a boric acid salt, especially melamine borate.

The carbon-yielding compound contained in the additive mixture is preferably a polyhydroxy compound and/or a thermoplastic or thermoset plastic polymeric resin binder such as especially a carbohydrate like sugar or starch, pentaerythritol, dipentaerythritol, a phenol resin, a urea resin, a polyurethane, polyvinyl chloride, poly(meth) acrylate, polyvinyl acetate, polyvinyl alcohol, a silicon resin and/or a caoutchouc.

As the particulate metal, the additive mixture used according to the invention preferably contains a metal selected from the group consisting of aluminum, magnesium, iron and zinc. Here, the particulate metal can be present in the form of a powder, platelets, scales, fibers, threads and/or whiskers. The particulate metal in the form of powder, platelets or scales preferably has a particle size $\leq 50$ $\mu$m, preferably ranging from 0.5 $\mu$m to 10 $\mu$m, while the fibers, threads and/or whiskers of the particulate metal have a thickness of 0.5 $\mu$m to 10 $\mu$m and a length of 10 $\mu$m to 50 $\mu$m.

An especially preferred additive mixture comprises a blend of 30 parts by weight of ammonium polyphosphate, 10 parts by weight of dipentaerythritol and 10 parts by weight of aluminum powder having a particle size of 5 $\mu$m. By adding this additive mixture in an amount of 25% to 40% by weight to the pliable organic binder, an especially pronounced increase in the mechanical strength of the fire protection plate in case of fire can be achieved.

According to the invention, it is also possible to add to the pliable organic binder, aside from the coarse-grained inorganic filler, at least one inorganic filler selected from among metal oxides, especially iron oxide, titanium dioxide, silicon dioxide and aluminum oxide, barite, borates, especially zinc borate, carbonates, preferably chalk, silicates, preferably alkali silicates, talcum, mica, wollastonite, kaolin and/or glass powder.

Moreover, the fire protection effect of the fire protection plate according to the invention can be increased in that, according to a preferred embodiment, additionally one or more flame retardants are incorporated into the pliable organic binder, for example, flame retardants containing halogen, ammonium phosphates, metal hydroxides, especially aluminum hydroxides or magnesium hydroxides, metal oxides, especially antimony oxides, red phosphorus and/or phosphorus compounds, especially halogenated phosphoric acid esters such as trichloroethyl phosphate, tris(2-chloroisopropyl)phosphate, triphenyl phosphate or tris (2-chloroethyl)phosphate.

In case of fire, the pliable organic binder degrades under the effect of the high temperatures of the fire and, together with the additives, forms an inorganic ceramic-like matrix in which the coarse-grained inorganic filler remains incorporated and which has a surprisingly high mechanical strength.

In order to produce the pliable polyurethane foam, preferably polyester polyols and OH-terminated polybutadiene, polymers, polyisocyanates (MDI or TDI), catalysts as well as plasticizers (polybutenes, phthalates, sulfonates, phosphoric acid esters) can be used, all of which are materials with which the person skilled in the art is familiar for the production of pliable polyurethane foams.

The production of the fire protection plate according to the invention is carried out in that the pliable organic binder or its initial products—optionally containing the above-mentioned additives and auxiliaries—is mixed with the coarse-grained inorganic filler, then the mixture is brought into a form with the desired dimensions and solidified, for example, by cooling off or curing. Especially preferred production processes are the RIM (Reaction Injection Molding) process in which the reaction components for the production of a polyurethane foam are injected into a mold together with the coarse-grained inorganic filler and optionally with the additive mixture, additional fillers, flame retardants, etc. in the form of a homogeneous mixture, and are reacted there in such a way that the resultant foam product completely fills the mold by the end of the reaction. Another preferred process consists of placing an isocyanate prepolymer—made up of a polyol component and of a polyisocyanate—together with the coarse-grained inorganic filler and optionally the above-mentioned additives, into the mold and hardening it there under heating by means of steam.

The starting materials needed for the production of pliable polyurethane foams such as polyols, polyisocyanates, catalysts, plasticizers, etc. as well as the conditions to be applied are known to the person skilled in the art. Examples of the catalysts to be used for this purpose, especially those that accelerate the isocyanate reaction (PIR), are amines and metallo-organic compounds such as dibutyl tin dilaurate (DBTL), calcium octoate or lead octoate. Examples of plasticizers are high-boiling, low-molecular-weight polybutadienes, phthalates (for example, diisononyl phthalate (DINP), dioctyl phthalate (D)OP)), sulfonates (for example, Mesamoll made by the Bayer AG company) and phosphoric acid esters such as tris (chloroisopropyl) phosphate (TCPP) and trichloroethyl phosphate (TEP).

The molds used for the production of the fire protection plate according to the invention are configured as a function of the envisaged dimensions. However, it is quite readily possible, specifically with the use of a pliable polyurethane foam as the organic binder and a coarse-grained inorganic filler in the form of grains made of foamed mineral material, to employ the above-mentioned RIM process to produce a large block that is subsequently cut to the desired sizes in the conventional manner by sawing it into fire protection plates.

Another subject matter of the invention is the use of the above-defined fire protection plates for the fire protection of openings in walls, floors and ceilings, especially of conduits for pipes and cables. The invention will be explained below in greater detail on the basis of the accompanying drawings and examples.

Figure 2:
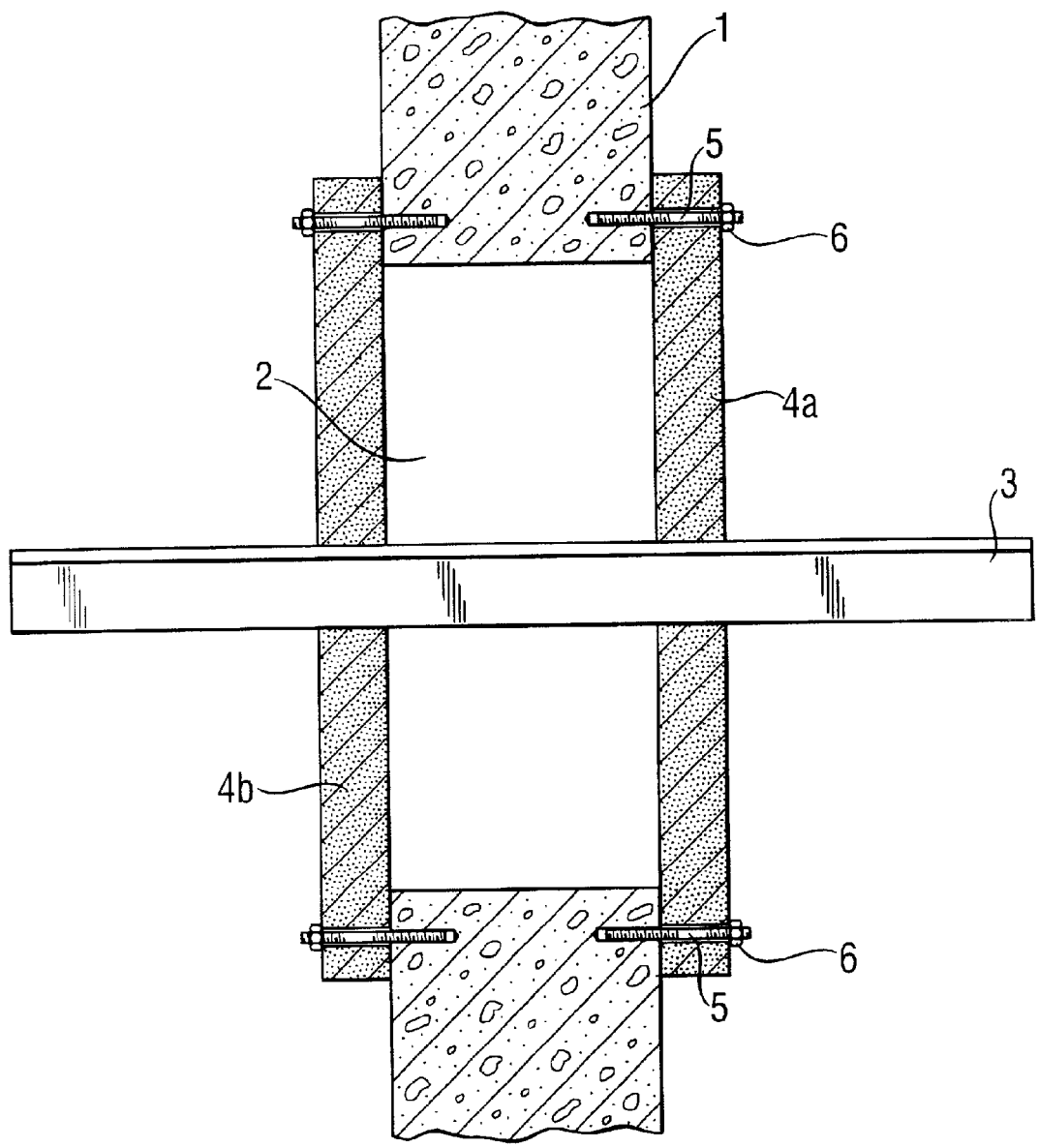

The drawings show the following:

FIG. 1 a first embodiment of the use of the fire protection plate according to the invention by installing it in the structure opening, and FIG. 2 a second embodiment of the use of the fire protection plate according to the invention by arranging it above the structure opening.

As is evident from the embodiment shown in FIG. 1, an opening (2) is provided in a wall (1) through which a cable conduit (3) is inserted. For sealing purposes, between the delineation of the opening on the wall side and on the outside of the inserted cable conduit, there are two fire protection plates (4a) and (4b) according to the invention that have been adapted to the contours of the wall opening in such a way that said fire protection plates are installed flush into the structure opening.

In the embodiment shown in FIG. 2, the fire protection plates (4a) and (4b) according to the invention are not inserted flush into the wall opening but rather mounted above the structure opening and attached to the wall by means of bolts (5) and nuts (6). Gaps, cracks, joints and spandrels are to be sealed with fireproof sealants.

It is evident that any other embodiment can be used for sealing the individual openings and conduits as a function of the geometric dimensions of the opening on the one hand and of the traversed structure on the other hand. These plates can also be used to encapsulate cable ducts and conduits as well as to sheathe steel girders and steel supports.

The following examples serve to further elucidate the invention.

EXAMPLE 1

The present example illustrates the production of the fire protection plate according to the invention by means of the RIM (Reaction Injection Molding) process.

In order to produce the plate, 1000 g of the following polyol mixture (which contains 25% of the additive mixture described below), 300 g of polyisocyanate (e.g. Desmodur VL) and 500 g of perlite having a particle size of 2 mm to 7 mm as the coarse-grained inorganic filler are mixed together, the compound is filled into a mold and hardened, thereby forming a fire protection plate having the dimensions attained as a function of the mold used.

The additive mixture used consists of:

71% ammonium polyphosphate (Exolit AP 422)
11% dipentaerythritol
8% zinc borate
10% aluminum powder (STAPA™ PA Reflexal X/80)

The polyol mixture used consists of:

| 40 | parts of a difunctional polyester polyol | OH number approx. 28 (Voranol EP 1900, DOW) |
|---|---|---|
| 30 | parts of a trifunctional polyester polyol | OH number approx. 28 (Voranol CP 6055, DOW) |
| 15 | parts of an OH-terminated polybutadiene | OH number approx. 47 (Poly bd. Elf Atochem) |
| 10 | parts of tris(chloroisopropyl) phosphate | |
| 3 | parts of isopropanol | |
| 2 | parts of water | |
| 0.01 | parts of catalyst (DBTL) | |
| 0.02 | parts of amine catalyst (triethylene diamine DABCO LV 33, Air Products) | |

EXAMPLE 2

In order to produce a fire protection plate according to the prepolymer method, 1200 g of an isocyanate prepolymer (for example, Desmodur E14) mixed with 30% of the above-defined additive mixture are mixed together with 500 g of perlite having a particle size of 2 mm to 7 mm as the coarse-grained inorganic filler, the material is placed into a mold and hardened using hot steam.

The fire protection plates produced according to the examples above have a high mechanical strength, specifically resistance to pressure, impact strength and intrinsic stability, but they can be worked easily by means of sawing, cutting, drilling and the like, since the binder surrounds and stabilizes the coarse-grained inorganic, preferably foamed, filler and, at the same time, reduces the resistance against cutting and sawing.

EXAMPLE 3

This example illustrates the behavior of the fire protection plate produced according to Example 1 in case of fire.

If a fire protection plate having a thickness of 2.5 cm is exposed to a flame, then, after 30 minutes at 1000° C. [1832° F.], the organic binder is completely transformed into an inorganic ceramic-like matrix in which the perlite grains are embedded; during the next 2 hours at 1200° C. [2192° F.], it undergoes no further change. The hose stream test required according to ASTM 814 in the USA in order to receive approval for 2 hours of fire resistance is passed with an opening cross section of 30 cm×30 cm without any problem.

What is claimed is:

1. A flexible fire protection plate having a plastic matrix and an inorganic filler, comprising a plate made of pliable organic binder in which a coarse-grained inorganic filler is embedded, wherein the pliable organic binder contains an additive to increase the dimensional stability of the crust that is formed, in case of fire, and wherein as the additive, it contains an additive mixture containing at least one acidifier, at least one compound that yields carbon and at least one particulate metal.

2. The fire protection plate according to claim 1, wherein as the pliable binder, it contains a pliable polyurethane polymer, a vulcanized caoutchoue compound, a dispersion acrylate and/or a polyvinyl acetate.

3. The fire protection plate according to claim 2, where in the pliable polyurethane polymer is either a polyurethane foam made of a polyisocyanate, of a polyvol and water, or else a polyurethane foam made with a foaming agent on the basis of a liquefied gas.

4. The fire protection plate according to claim 1, wherein it contains 30% to 80% by weight, preferably 65% to 75%, of the pliable binder and 70% to 20% by weight, preferably 35% to 25% by weight, of the coarse-grained inorganic filler.

5. The fire protection plate according to claim 1, wherein as the coarse-grained inorganic filler, it contains grains having a particle size of 1 mm to 25 mm, preferably 3 mm to 15 mm.

6. The fire protection plate according to claim 5, wherein as the coarse-grained inorganic filler, it contains grains made of a foamed mineral material.

7. The fire protection plate according to claim 1, wherein as the coarse-grained inorganic filler, it contains grains made of pumice, porous concrete, water-glass foam, geopolymers, sepiolite, fly ash, gypsum, foamed expanded clay, perlite and/or vermiculite, or else in the form of hollow beads made of silicate material or glass.

8. The fire protection plate according to claim 1, wherein the pliable organic binder contains 10% to 60% by weight, preferably 25% to 40% by weight, of the additive mixture.

9. The fire protection plate according to claim 8, wherein the additive mixture contains 10% to 90% by weight, preferably 40% to 70% by weight, of the acidifier, 5% to 45% by weight, preferably 15% to 20% by weight, of the compound that yields carbon and 2% to 30% by weight, preferably 5% to 15% by weight, of the particulate metal.

10. The fire protection plate according to claim 9, wherein as the acidifier, the additive mixture contains a salt or an ester of an inorganic, non-volatile acid selected from among sulfuric acid, phosphoric acid or boric acid.

11. The fire protection plate according to claim 10, wherein as the acidifier, the additive mixture contains ammonium phosphate, ammonium polyphosphate, a diamine phosphate, a phosphoric acid ester with monovalent or polyvalent alcohols, especially polyols, such as pentaerythritol, specifically pentaerythritol phosphate, trichloroethyl phosphate, tris(2-chloroisopropyl) phosphate, triphenyl phosphate, tris(2-chloroethyl) phosphate, a phosphoric acid partial ester or phosphoric acid hetero-ester with monovalent and/or polyvalent low-molecular-weight alcohols, a melamine phosphate, especially monomelamine orthophosphate, dimelamine orthophosphate, dimelamine pyrophosphate, melamine polyphosphate and/or a boric acid salt, especially melamine borate.

12. The fire protection plate according to claim 1, wherein as the carbon-yielding compound, the additive mixture contains a polyhydroxy compound and/or a thermoplastic or thermoset plastic polymeric resin binder.

13. The fire protection plate according to claim 12, wherein as the carbon-yielding compound, the additive mixture contains a carbohydrate like sugar or starch, pentaerythritol, dipentaerythritol, a phenol resin, a urea resin, a polyurethane, polyvinyl chloride, poly(meth)acrylate, polyvinyl acetate, polyvinyl alcohol, a silicon resin and/or a caoutchouc.

14. The fire protection plate according to claim 1, wherein as the particulate metal, it contains a metal selected from the group comprising aluminum, magnesium, iron and zinc.

15. The fire protection plate according to claim 14, wherein the additive mixture contains the particulate metal in the form of a powder, platelets, scales, fibers, threads and/or whiskers.

16. The fire protection plate according to claim 15, wherein the particulate metal in the form of powder, platelets or scales has a particle size $\leq 50$ $\mu$m to 0.5 $\mu$m to 10 $\mu$m.

17. The fire protection plate according to claim 15, wherein the fibers, threads and/or whiskers of the particulate metal have a thickness of 0.5 $\mu$m to 10 $\mu$m and a length of 10 $\mu$m to 50 $\mu$m.

18. The fire protection plate according to claim 1, wherein the pliable organic binder additionally contains at least one inorganic filler selected from among metal oxides, especially iron oxide, titanium dioxide, silicon di oxide and aluminum oxide, barite, borates, especially zinc borate, cargonates, preferably chalk, silicates, preferably alkali silicates, talcum, mica, wollastonite, kaolin and/or glass powder.

19. The fire protection plate according to claim 1, wherein the pliable organic binder additionally contains one or more flame retardants.

20. The fire protection plate according to claim 19, wherein as an additional flame retardant, the pliable organic binder additionally contains a flame retardant containing halogen, an ammonium phosphate, a metal hydroxide, especially aluminum hydroxide or magnesium hydroxide, a metal oxide, especially antimony oxide, red phosphorus and/or a phosphorus compound, especially a halogenated phosphoric acid ester such as trichloroethyl phosphate, tris(2-chloroisopropyl) phosphate, triphenyl phosphate or tris(2-chloroethyl) phosphate.

* * * * *